(12) United States Patent
Tabata

(10) Patent No.: US 12,088,783 B2
(45) Date of Patent: Sep. 10, 2024

(54) IMAGING APPARATUS AND GAIN RATIO ACQUISITION METHOD THEREFOR

(71) Applicant: SONY SEMICONDUCTOR SOLUTIONS CORPORATION, Kanagawa (JP)

(72) Inventor: Hidenori Tabata, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/905,782

(22) PCT Filed: Mar. 11, 2021

(86) PCT No.: PCT/JP2021/009900
§ 371 (c)(1),
(2) Date: Sep. 7, 2022

(87) PCT Pub. No.: WO2021/187333
PCT Pub. Date: Sep. 23, 2021

(65) Prior Publication Data
US 2024/0214551 A1   Jun. 27, 2024

(30) Foreign Application Priority Data

Mar. 16, 2020  (JP) ................................. 2020-044937
Aug. 25, 2020  (JP) ................................. 2020-141936

(51) Int. Cl.
*H04N 17/00*  (2006.01)
*H04N 25/51*  (2023.01)
*H04N 25/69*  (2023.01)
*H04N 25/78*  (2023.01)

(52) U.S. Cl.
CPC ........... *H04N 17/002* (2013.01); *H04N 25/51* (2023.01); *H04N 25/69* (2023.01); *H04N 25/78* (2023.01)

(58) Field of Classification Search
None
See application file for complete search history.

(56) References Cited

FOREIGN PATENT DOCUMENTS

| JP | 04-172086 A | 6/1992 |
|---|---|---|
| JP | 2005-175517 A | 6/2005 |
| JP | 2008-141609 A | 6/2008 |
| JP | 2009-284181 A | 12/2009 |

OTHER PUBLICATIONS

International Search Report and Written Opinion of PCT Application No. PCT/JP2021/009900, issued on Jun. 15, 2021, 09 pages of ISRWO.

*Primary Examiner* — Mark T Monk
(74) *Attorney, Agent, or Firm* — CHIP LAW GROUP

(57) ABSTRACT

An object of the present invention is to reduce time required for calibration between gains in a level control circuit. The level control circuit performs, using any of first and second gains that differ from each other, level control of an analog signal output to a vertical signal line that corresponds to each column of a pixel array. An analog-digital converter converts the level-controlled analog signal into a digital signal. A test signal generating unit generates first and second test signals that differ from each other. A gain ratio acquiring unit simultaneously supplies one of the vertical signal lines with the first test signal and supplies another of the vertical signal lines with the second test signal to acquire a gain ratio between the first gain and the second gain of the level control circuit.

11 Claims, 18 Drawing Sheets

IMAGING APPARATUS AND GAIN RATIO ACQUISITION METHOD THEREFOR

CROSS REFERENCE TO RELATED APPLICATIONS

This application is a U.S. National Phase of International Patent Application No. PCT/JP2021/009900 filed on Mar. 11, 2021, which claims priority benefit of Japanese Patent Application No. JP 2020-044937 filed in the Japan Patent Office on Mar. 16, 2020, which claims priority benefit of Japanese Patent Application No. JP 2020-141936 filed in the Japan Patent Office on Aug. 25, 2020. Each of the above-referenced applications is hereby incorporated herein by reference in its entirety.

TECHNICAL FIELD

The present technique relates to an imaging element. More specifically, the present technique relates to a calibration technique between gains in a level control circuit in an imaging element.

BACKGROUND ART

In recent years, for the purpose of noise improvement of a column readout circuit in an image, an adaptive gain control (AGC) function for performing readout at a high gain during low illumination and performing readout at a low gain during high illumination is utilized in a level control circuit. When using the AGC function, in order to maintain signal linearity between high gain data and low gain data, processing of restoring the high gain data using a gain ratio between high gain and low gain is performed in a digital circuit in a stage subsequent to an AD converter (Analog to Digital Converter). Since a gain ratio deviation between the high gain and the low gain is created due to manufacturing variability when performing restoration and causes a level difference at a joint or a gain linearity error, a need arises to calculate an actual gain ratio by calibration and to correct the deviation of the gain ratio. As an associated technique, for example, an imaging apparatus that probabilistically varies a threshold is proposed as a technique for eliminating inconvenience caused by switching among exposure amounts (for example, refer to PTL 1).

CITATION LIST

Patent Literature

[PTL 1]
JP H04-172086 A

SUMMARY

Technical Problem

The conventional art described above assumes, when performing calibration between gains in a level control circuit, sequentially acquiring low illumination data and high illumination data of each gain and acquiring an actual gain ratio. Therefore, there is a problem in that a longer amount of time is required for calibration and a longer wait time is required until start of readout of imaging data.

The present technique has been devised in view of such circumstances and an object thereof is to reduce an amount of time required for calibration between gains in a level control circuit.

Solution to Problem

The present technique has been devised in order to solve the problem described above and a first aspect thereof is an imaging apparatus and a gain ratio acquisition method therefor, the imaging apparatus including: a level control circuit configured to perform, using any of first and second gains that differ from each other, level control of an analog signal output to a vertical signal line that corresponds to each column of a pixel array; an analog digital converter configured to convert the level-controlled analog signal into a digital signal; a test signal generating unit configured to generate first and second test signals that differ from each other; and a gain ratio acquiring unit configured to simultaneously supply one of the vertical signal lines with the first test signal and supply another of the vertical signal lines with the second test signal to acquire a gain ratio between the first gain and the second gain of the level control circuit. Accordingly, an effect of acquiring a gain ratio by simultaneously supplying one of the vertical signal lines and another vertical signal line with different test signals is produced.

In addition, in the first aspect, the imaging apparatus may further include: a gain ratio correction value generating unit configured to generate a gain ratio correction value based on the acquired gain ratio; and a correcting unit configured to correct the digital signal in accordance with the gain ratio correction value generated by the gain ratio correction value generating unit. Accordingly, an effect of correcting a digital signal based on an acquired gain ratio is produced.

Furthermore, in the first aspect, the test signal generating unit may be configured to generate a potential of high illumination data as the first test signal and to generate a potential of low illumination data as the second test signal. Accordingly, an effect of generating potentials of high illumination data and low illumination data as test signals is produced.

In addition, in the first aspect, the one of the vertical signal lines may be a vertical signal line of an odd-numbered column and the other of the vertical signal lines may be a vertical signal line of an even-numbered column. Accordingly, an effect of utilizing different test signals between adjacent columns is produced.

Furthermore, in the first aspect, for each gain of the level control circuit respectively set to 0 dB, the first gain, and the second gain, the gain ratio acquiring unit may be configured to acquire the gain ratio by simultaneously supplying the one of the vertical signal lines with the first test signal and supplying the other of the vertical signal lines with the second test signal and subsequently simultaneously supplying the one of the vertical signal lines with the second test signal and supplying the other of the vertical signal lines with the first test signal. Accordingly, an effect of acquiring a gain ratio by supplying one of the vertical signal lines and another vertical signal line with first and second test signals by sequentially switching between the first and second test signals is produced.

In addition, in the first aspect, the analog-digital converter may be provided for each of the plurality of vertical signal lines, and the gain ratio acquiring unit may be configured to simultaneously supply the one of the vertical signal lines with the first test signal and supply the other of the vertical signal lines with the second test signal and, for each gain of the level control circuit respectively set to 0 dB, the first gain, and the second gain, acquire the gain ratio by sequentially selecting the first and second test signals supplied to any of the one of the vertical signal lines and the other of the vertical signal lines. Accordingly, an effect of acquiring a gain ratio by supplying first and second test signals by sequentially switching between the first and second test signals on a path from one of the vertical signal lines and another vertical signal line to an analog-digital converter is produced.

Furthermore, in the first aspect, the imaging apparatus may further include: a first sample-and-hold unit configured to hold an analog signal output to the one of the vertical signal lines and a second sample-and-hold unit configured to hold an analog signal output to the other of the vertical signal lines, wherein the level control circuit may be configured to sequentially perform the level control with respect to an output of any of the first and second sample-and-hold units, and the analog-digital converter may be configured to sequentially perform AD conversion with respect to the plurality of outputs of the level control circuit. Accordingly, an effect of acquiring a gain ratio by supplying analog signals from the one of the vertical signal lines and the other of the vertical signal lines by switching among the analog signals using the first and second sample-and-hold units is produced.

In addition, in the first aspect, each of the first and second sample-and-hold units may include two alternately operating sample-and-hold circuits. Accordingly, an effect of simultaneously performing a pipeline operation of a sampling operation and an AD conversion operation is produced.

Furthermore, in the first aspect, the level control circuit may be an analog gain circuit configured to output a voltage signal obtained by subjecting the analog signal to level control, and the analog-digital converter may be a single slope analog-digital converter configured to convert the voltage signal into the digital signal.

In addition, in the first aspect, the level control circuit may be a voltage-to-current converter configured to output a current signal obtained by subjecting the analog signal to level control, and the analog-digital converter may be a current-input type analog-digital converter configured to convert the current signal into the digital signal.

DESCRIPTION OF EMBODIMENTS

Modes for implementing the present technique (hereinafter, referred to as embodiments) will be described hereinafter. The descriptions will be given in the following order.
1. First embodiment (example of changing test voltage in a time-shared manner with test voltage generating circuit)
2. Second embodiment (example of switching test voltages on path to AD converter)
3. Third embodiment (example assuming current-input type AD converter according to first embodiment)
4. Fourth embodiment (example assuming current-input type AD converter according to second embodiment)

1. First Embodiment

[Imaging Apparatus]

Figure 1:
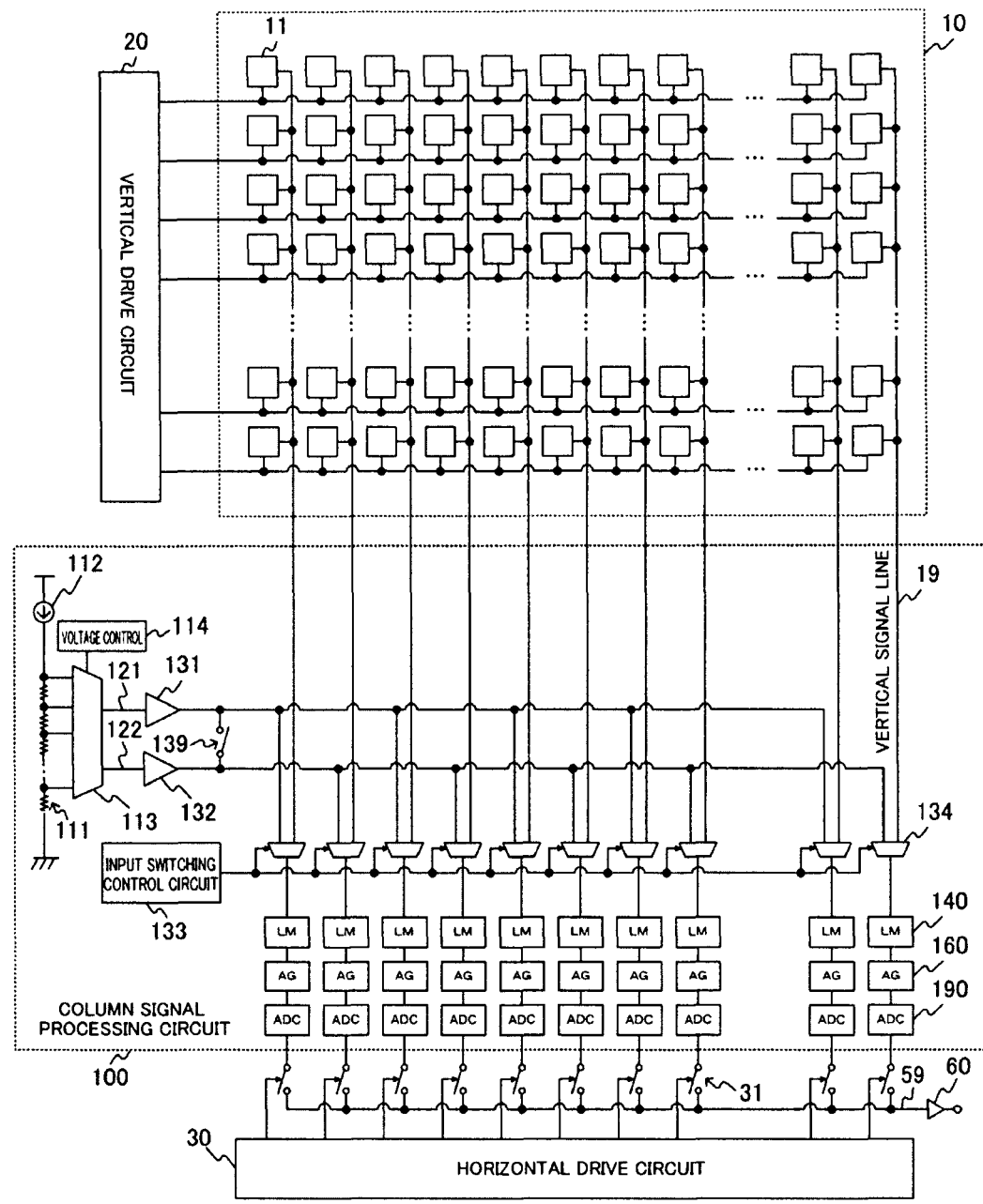
FIG. 1 is a diagram showing an overall configuration example of an imaging apparatus according to a first embodiment of the present technique.

FIG. 1 is a diagram showing an overall configuration example of an imaging apparatus according to a first embodiment of the present technique.

The imaging apparatus is constituted of a pixel array 10 and a peripheral circuit unit. The peripheral circuit unit includes a vertical drive circuit 20, a horizontal drive circuit 30, a column signal processing circuit 100, and an output circuit 60.

The pixel array 10 is a pixel array in which a plurality of pixels 11 including a photoelectric conversion unit are arranged in a two-dimensional array. Each of the pixels 11 has, for example, a photodiode to function as the photoelectric conversion unit and a plurality of pixel transistors. In this case, for example, the plurality of pixel transistors can be constituted of three transistors: a transfer transistor, a reset transistor, and an amplifier transistor.

The vertical drive circuit 20 drives the pixels 11 in units of rows. For example, the vertical drive circuit 20 is constituted of a shift register. The vertical drive circuit 20 selects a pixel driving wiring and supplies the selected pixel driving wiring with a pulse for driving the pixels 11. Accordingly, the vertical drive circuit 20 sequentially performs selection scanning on the pixels 11 in the pixel array 10 in a vertical direction in units of rows, and supplies the column signal processing circuit 100 via vertical signal lines (VSLs) 19 with a pixel signal based on signal charges generated in accordance with an amount of light received by a photoelectric conversion unit of each of the pixels 11.

The horizontal drive circuit 30 drives the column signal processing circuit 100 in units of columns. For example, the horizontal drive circuit 30 is constituted of a shift register. By sequentially outputting a horizontal scanning pulse, the horizontal drive circuit 30 selects each of the column signal processing circuits 100 in order, and outputs a pixel signal from each of the column signal processing circuits 100 to a horizontal signal line 59 via a switch 31.

In addition, the peripheral circuit unit includes a control circuit (not illustrated). The control circuit is configured to control the imaging apparatus as a whole, receives input clocks and data instructing an operation mode and the like, and outputs data such as internal information of the imaging apparatus. That is, the control circuit generates clock signals and control signals serving as references for operations of the vertical drive circuit 20, the column signal processing circuits 100, the horizontal drive circuit 30, and the like on the basis of vertical sync signals, horizontal sync signals and master clocks. Furthermore, the control circuit inputs these signals to the vertical drive circuit 20, the column signal processing circuits 100, the horizontal drive circuit 30, and the like.

The column signal processing circuit 100 performs signal processing such as noise reduction of signals outputted from the pixels 11 of one row for every pixel column. For example, the column signal processing circuit 100 performs signal processing for removing fixed pattern noise specific to a pixel 11 such as correlated double sampling (CDS), signal amplification, and analog-digital conversion.

The column signal processing circuit 100 includes, for each pixel column, a load MOS 140, an analog gain circuit 160, and an AD converter 190. The load MOS (LM: Load Metal-Oxide-Semiconductor) 140 is a MOS transistor to be connected to each of the vertical signal lines 19 and functions as a current source 141. The analog gain circuit (AG: Analog Gain) 160 is a circuit which subjects an analog signal input from the load MOS 140 to level control by a predetermined gain. The AD converter (ADC: Analog to Digital Converter) 190 is a circuit which converts an analog signal being a voltage signal from the analog gain circuit 160 into a digital signal. It should be noted that the analog gain circuit 160 is an example of the level control circuit described in the claims.

The output circuit 60 performs signal processing on signals sequentially supplied through the horizontal signal line 59 from each pixel column of the column signal processing circuits 100 and outputs the processed signals. In doing so, the output circuit 60 buffers the signals from the column signal processing circuits 100. In addition, the output circuit 60 may perform black level control, column variation correction, various kinds of digital signal processing, and the like with respect to the signals from the column signal processing circuits 100.

In the analog gain circuit 160, in order to correct a gain ratio deviation between a high gain and a low gain, calibration between the gains must be performed. To this end, the imaging apparatus includes a test voltage generating circuit and outputs a test voltage. Each of the vertical signal lines 19 is provided with a selector 134 and the selector 134 is configured to select, in accordance with a control signal from an input switching control circuit 133, any of a pixel signal from the vertical signal line 19 and a test voltage from the test voltage generating circuit and to supply the load MOS 140 with the pixel signal or the test voltage.

The test voltage generating circuit includes a resistor 111, a current source 112, a selector 113, and a voltage control register 114. A current from the current source 112 flows into the resistor 111 connected in series, and a potential at each terminal is input to an input terminal of the selector 113. The voltage control register 114 is connected to a selection signal terminal of the selector 113, and the selector 113 outputs a voltage signal in accordance with a value of the voltage control register 114 to signal lines 121 and 122 from an output terminal. In other words, by changing a setting value of the voltage control register 114, voltage signals to be output to the signal lines 121 and 122 can be switched. It should be noted that the resistor 111, the current source 112, and the selector 113 are examples of the test signal generating unit described in the claims. In addition, the voltage control register 114, the input switching control circuit 133, and the selector 134 are examples of the gain ratio acquiring unit described in the claims.

Output buffers 131 and 132 are respectively connected to the signal lines 121 and 122 on an output side of the selector 113. An output of the one output buffer 131 corresponds to the vertical signal line 19 of an odd-numbered column and an output of the other output buffer 132 corresponds to the vertical signal line 19 of an even-numbered column. Accordingly, a configuration is realized in which an odd-numbered column and an even-numbered column can be supplied with mutually different voltage signals. While the output of the output buffer 131 and the output of the output buffer 132 can be short-circuited by a switch 139 and an odd-numbered column and an even-numbered column can be supplied with the same voltage signal, in the present embodiment, the switch 139 is used in an open state.

Due to the configuration described above, by respectively applying a potential VH of high illumination data to the signal line 121 and a potential VL of low illumination data to the signal line 122, the potential VH of high illumination data is output to an odd-numbered column and the potential VL of low illumination data is output to an even-numbered column. In addition, by respectively applying the potential VL of low illumination data to the signal line 121 and the potential VH of high illumination data to the signal line 122, the potential VL of low illumination data is output to an odd-numbered column and the potential VH of high illumination data is output to an even-numbered column.

[Column Signal Processing Circuit]

Figure 2:
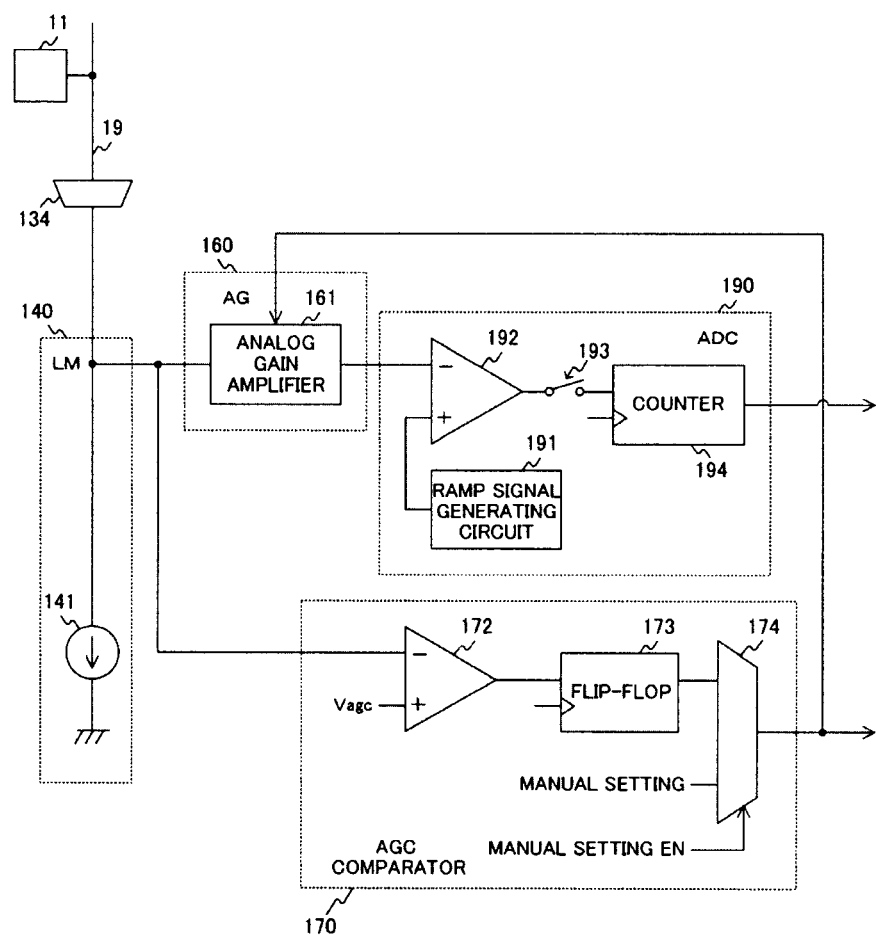
FIG. 2 is a diagram showing a circuit configuration example for each pixel column of a column signal processing circuit 100 according to the first embodiment of the present technique.

FIG. 2 is a diagram showing a circuit configuration example for each pixel column of the column signal processing circuit 100 according to the first embodiment of the present technique.

As described above, the column signal processing circuit 100 includes, for each pixel column, the load MOS 140, the analog gain circuit 160, and the AD converter 190. In the first embodiment, a single slope analog-digital converter is assumed as the AD converter 190.

In addition, an AGC comparator 170 is provided in order to perform adaptive gain control (AGC) in the analog gain circuit 160. The AGC comparator 170 includes a comparator 172, a flip-flop 173, and a selector 174.

The comparator 172 compares an input voltage value and an AGC threshold with each other to determine whether the input voltage value is low illumination or high illumination. The analog gain circuit 160 having received the determination result thereof utilizes high gain (HG) when low illumination is determined but utilizes low gain (LG) when high illumination is determined.

The flip-flop 173 is a flip-flop that holds a determination result by the comparator 172. In other words, the flip-flop 173 holds a determination of an input voltage value to be low illumination or high illumination in an immediately previous determination result.

The selector 174 selects any one of a value held in the flip-flop 173 and a manually-set value in accordance with a selection signal (manual setting EN) and supplies the analog gain circuit 160 with the selected value. While the analog gain circuit 160 is supplied with a value held in the flip-flop 173 in the case of a normal data signal, when performing calibration between gains, a manually-set value is utilized as will be described later.

The analog gain circuit 160 includes an analog gain amplifier 161. The analog gain amplifier 161 amplifies, in accordance with a gain of a gain signal (high gain or low gain) input from the AGC comparator 170, an analog data signal input from the load MOS 140.

The AD converter 190 includes a ramp signal generating circuit 191, a comparator 192, and a counter 194.

The ramp signal generating circuit 191 generates a ramp signal to be compared with an input signal. A ramp signal is a signal of which a signal level monotonously increases or monotonously decreases as time elapses. The ramp signal generating circuit 191 is constituted of, for example, a digital-to-analog converter (DAC).

The comparator 192 compares a ramp signal from the ramp signal generating circuit 191 with an input signal to determine a magnitude relationship of the signals. The counter 194 counts, in accordance with a determination result by the comparator 192, the time until the magnitude relationship is reversed.

Accordingly, an input signal that is an analog signal can be converted into a digital signal.

[Gain Ratio Correction]

Figure 3:
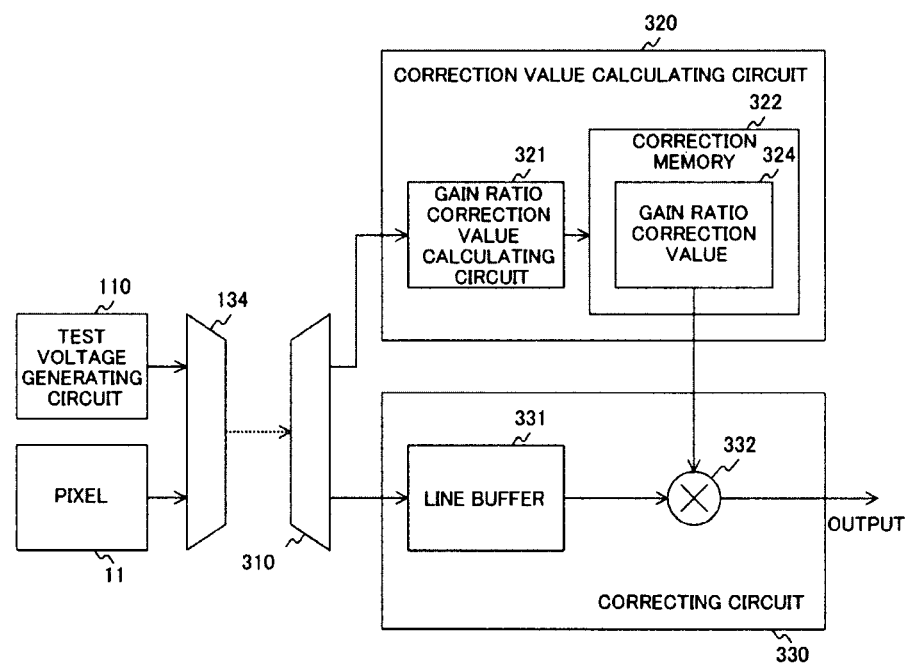
FIG. 3 is a diagram showing a circuit configuration example for gain ratio correction according to the first embodiment of the present technique.

FIG. 3 is a diagram showing a circuit configuration example for gain ratio correction according to the first embodiment of the present technique.

As described above, the selector 134 selects any of a pixel signal from the pixel 11 and a test voltage from a test voltage generating circuit 110. In addition, while partially omitted in the diagram, gain ratio correction is performed by a signal processing unit in a subsequent state with respect to an output signal having been output from the output circuit 60. The signal processing unit includes a switch 310, a correction value calculating circuit 320, and a correcting circuit 330.

The correction value calculating circuit 320 calculates a correction value by calibration and holds the calculated correction value. The correction value calculating circuit 320 includes a gain ratio correction value calculating circuit 321 and a correction memory 322. As will be described later, the gain ratio correction value calculating circuit 321 calculates a correction value for gain ratio correction by calibration. The correction memory 322 stores a calculation result by the gain ratio correction value calculating circuit 321 as a gain ratio correction value 324. The correction value calculating circuit 320 is an example of the gain ratio correction value generating unit described in the claims.

The correcting circuit 330 corrects a gain ratio using a correction value calculated by the correction value calculating circuit 320. The correcting circuit 330 includes a line buffer 331 and a multiplier 332. The line buffer 331 is a buffer that holds, for each line, an output signal having been output from the output circuit 60. The multiplier 332 multiplies a signal held in the line buffer 331 by the gain ratio correction value 324 stored in the correction memory 322 to correct a gain ratio. The correcting circuit 330 is an example of the correcting unit described in the claims.

The switch 310 is a switch that sorts an output signal having been output from the output circuit 60 to the correction value calculating circuit 320 or the correcting circuit 330. During calibration, the switch 310 outputs a test voltage from the test voltage generating circuit 110 to the correction value calculating circuit 320 and, during pixel data readout, the switch 310 outputs a pixel signal from the pixel 11 to the correcting circuit 330. Accordingly, gain ratio correction is performed during pixel data readout by the correction value calculated during calibration.

[Calibration]

Figure 4:
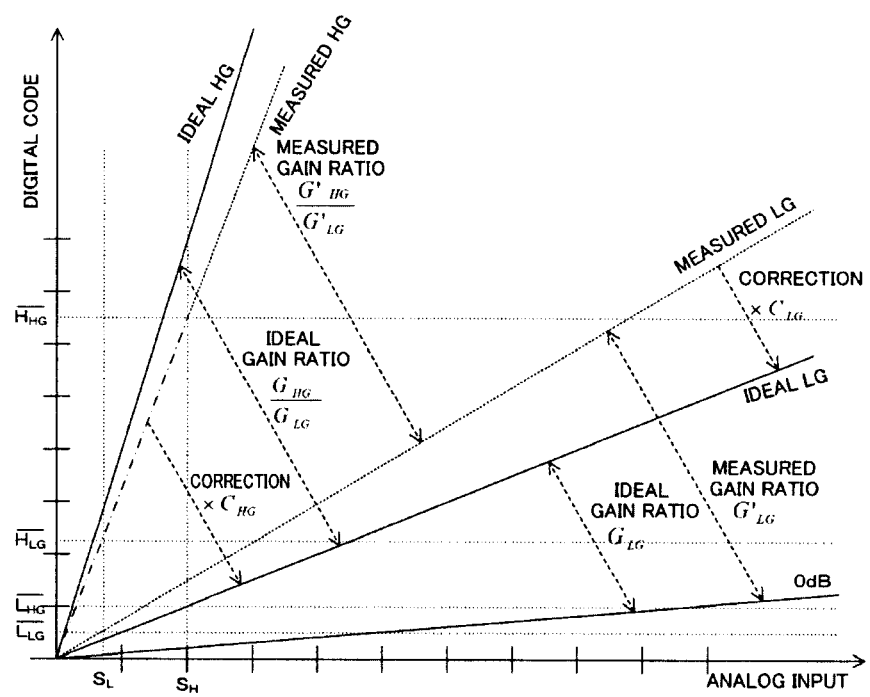
FIG. 4 is a diagram showing an acquisition method of a gain ratio correction value during calibration according to the first embodiment of the present technique.

FIG. 4 is a diagram for explaining an acquisition method of a gain ratio correction value during calibration according to the first embodiment of the present technique.

In the graph in the diagram, an abscissa represents an analog value and an ordinate represents a digital code. As described above, in the analog gain circuit 160, gain control due to an AGC function is performed by switching between high gain and low gain. During calibration, the AGC function of the analog gain circuit 160 is turned off and analog gain is manually controlled, and digital values after AD conversion when inputting analog low illumination data and analog high illumination data are acquired for each gain. In doing so, digital values for low illumination data and high illumination data are similarly acquired for 0 dB gain to be used as a reference. For example, 12 dB is assumed as low gain and 24 dB is assumed as high gain.

In addition, for each gain, a line average (an average of all columns) of an illuminance difference between low illumination data and high illumination data is calculated. A line average $UD_0$ of an illuminance difference at 0 dB is expressed as a difference between an average UH of high illumination data and an average UL of low illumination data.

$$UD_0 = (UH - UL)$$

In addition, a line average $UD_{LG}$ of an illuminance difference at low gain is expressed as a difference between an average $UH_{LG}$ of high illumination data and an average $UL_{LG}$ of low illumination data which is equal to a product of a measured gain ratio $G'_{LG}$ of low gain with respect to 0 dB gain to be a reference multiplied by $UD_0$.

$$UD_{LG} = UH_{LG} - UL_{LG} = G'_{LG} \times (UH - UL)$$

In a similar manner, a line average $UD_{HG}$ of an illuminance difference at high gain is expressed as a difference between an average $UH_{HG}$ of high illumination data and an average $UL_{HG}$ of low illumination data which is equal to a product of a measured gain ratio $G'_{HG}$ of high gain with respect to 0 dB gain to be a reference multiplied by $UD_0$.

$$UD_{HG} = UH_{HG} - UL_{HG} = G'_{HG} \times (UH - UL)$$

A correction value $C_{LG}$ for low gain and a correction value $C_{HG}$ for high gain are calculated from ratios of illuminance difference line averages obtained as described above. However, an ideal gain ratio of low gain relative to 0 dB gain to be a reference is assumed to be $G_{LG}$ and an ideal gain ratio of high gain relative to 0 dB gain to be a reference is assumed to be $G_{HG}$.

$$C_{LG} = (UD_0/UD_{LG}) \times G_{LG} = (G_{LG}/G'_{LG})$$

$$C_{HG} = (UD_{LG}/UD_{HG}) \times C_{LG}$$

$$= (G'_{LG}/G'_{HG}) \times (G_{LG}/G'_{LG}) = (G_{LG}/G'_{HG})$$

A gain ratio deviation between low gain and high gain can be corrected by multiplying measured data by the correction value $C_{LG}$ for low gain and the correction value $C_{HG}$ for high gain. In addition, accordingly, restoration of data of high gain based on data of low gain is simultaneously performed.

[Operation]

Figure 5:
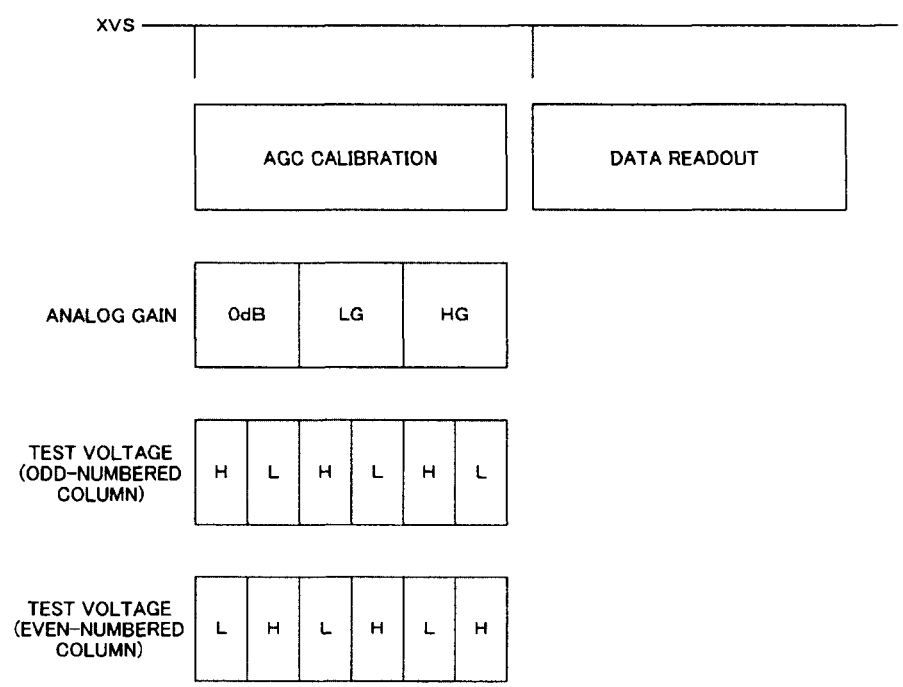
FIG. 5 is a diagram showing an operation timing example of calibration according to the first embodiment of the present technique.

FIG. 5 is a diagram showing an operation timing example of calibration according to the first embodiment of the present technique.

Prior to data readout, calibration of AGC of the analog gain circuit 160 is performed in one horizontal detection period (1 XHS:1 Horizontal Sync signal period). During the calibration, with respect to a total of three gains including 0 dB gain to be a reference in addition to a low gain and a high gain of the analog gain circuit 160, the potential VH of high illumination data and the potential VL of low illumination data are to be used as test voltage. In doing so, according to the configuration described above, performing parallel operations by using mutually different voltage signals as test voltages for an odd-numbered column and an even-numbered column, acquisition time of test data can be reduced.

In addition, since there is a risk that correction accuracy may deteriorate due to circuit manufacturing variability when a relationship between a potential of illuminance data and the AD converter 190 is fixed, a connection between the test voltage generating circuit 110 and the vertical signal lines 19 is switched in a time-shared manner. In other words, an operation is repetitively performed in which, after outputting the potential VH of high illumination data to an odd-numbered column and outputting the potential VL of low illumination data to an even-numbered column, the potential VL of low illumination data is output to an odd-numbered column and the potential VH of high illumination data is output to an even-numbered column. Accordingly, information on high illumination data and low illumination data can be evenly acquired for each gain.

Figure 6:
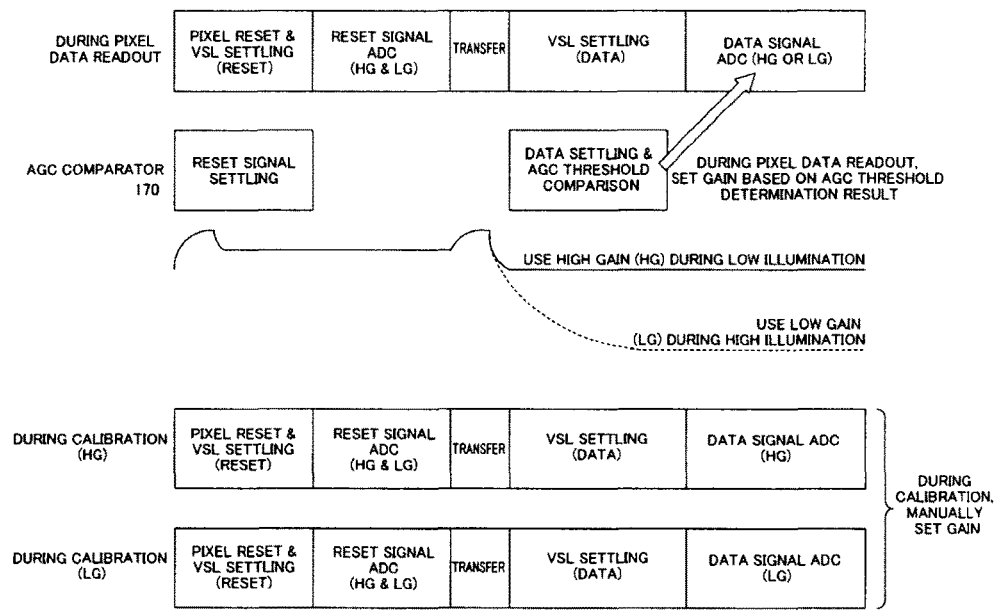
FIG. 6 is a diagram showing an operation timing example of the imaging apparatus according to the first embodiment of the present technique.

FIG. 6 is a diagram showing an operation timing example of the imaging apparatus according to the first embodiment of the present technique.

Pixel reset is performed prior to reading out a data signal. In other words, in the pixel 11, an electric charge is reset and time is secured for a voltage value of the vertical signal line 19 to settle (stabilize) due to the reset. At this point, a settling time due to the reset is also performed in a similar manner in the AGC comparator 170.

After reset settling, AD conversion of a reset signal is performed by the AD converter 190. In doing so, gain adjustment is performed at both high gain and low gain in the analog gain circuit 160.

Subsequently, in the pixel 11, exposed electric charge is transferred as a data signal and time for the voltage value of the vertical signal line 19 to settle due to the data signal is secured. At this point, an input voltage value and the AGC threshold are compared with each other by the comparator 172 of the AGC comparator 170 and a comparison result thereof is held by the flip-flop 173.

When pixel data is read out during AD conversion of a next timing, the value held in the flip-flop 173 is selected by the selector 174 and the gain of the analog gain circuit 160 is set in accordance with a comparison result of the selected value with the AGC threshold. In other words, gain adjustment is performed by the analog gain circuit 160 and AD conversion is performed by the AD converter 190 using a high gain in the case of low illumination and using a low gain in the case of high illumination.

On the other hand, during calibration, a comparison result with the AGC threshold is not used and a manually-set value is selected by the selector 174. In other words, a high gain is set in the case of a high-gain calibration and a low gain is set in the case of a low-gain calibration.

As described above, according to the first embodiment of the present technique, performing parallel operations by using mutually different voltage signals as test voltages for an odd-numbered column and an even-numbered column during calibration according to AGC, acquisition time of test data can be reduced. In addition, switching voltage signals between an odd-numbered column and an even-numbered column in a time-shared manner enables deterioration of correction accuracy to be prevented.

2. Second Embodiment

In the first embodiment described above, deterioration of correction accuracy is prevented by switching test signals between an odd-numbered column and an even-numbered column in a time-shared manner. By comparison, in the second embodiment, a technique of preventing deterioration of correction accuracy without performing switching of test signals will be described, the technique being premised on providing a set of an analog gain circuit and a plurality of sample-and-hold circuits that share the analog gain circuit in plurality and performing a pipeline operation in each of the sets.

[Imaging Apparatus]

Figure 7:
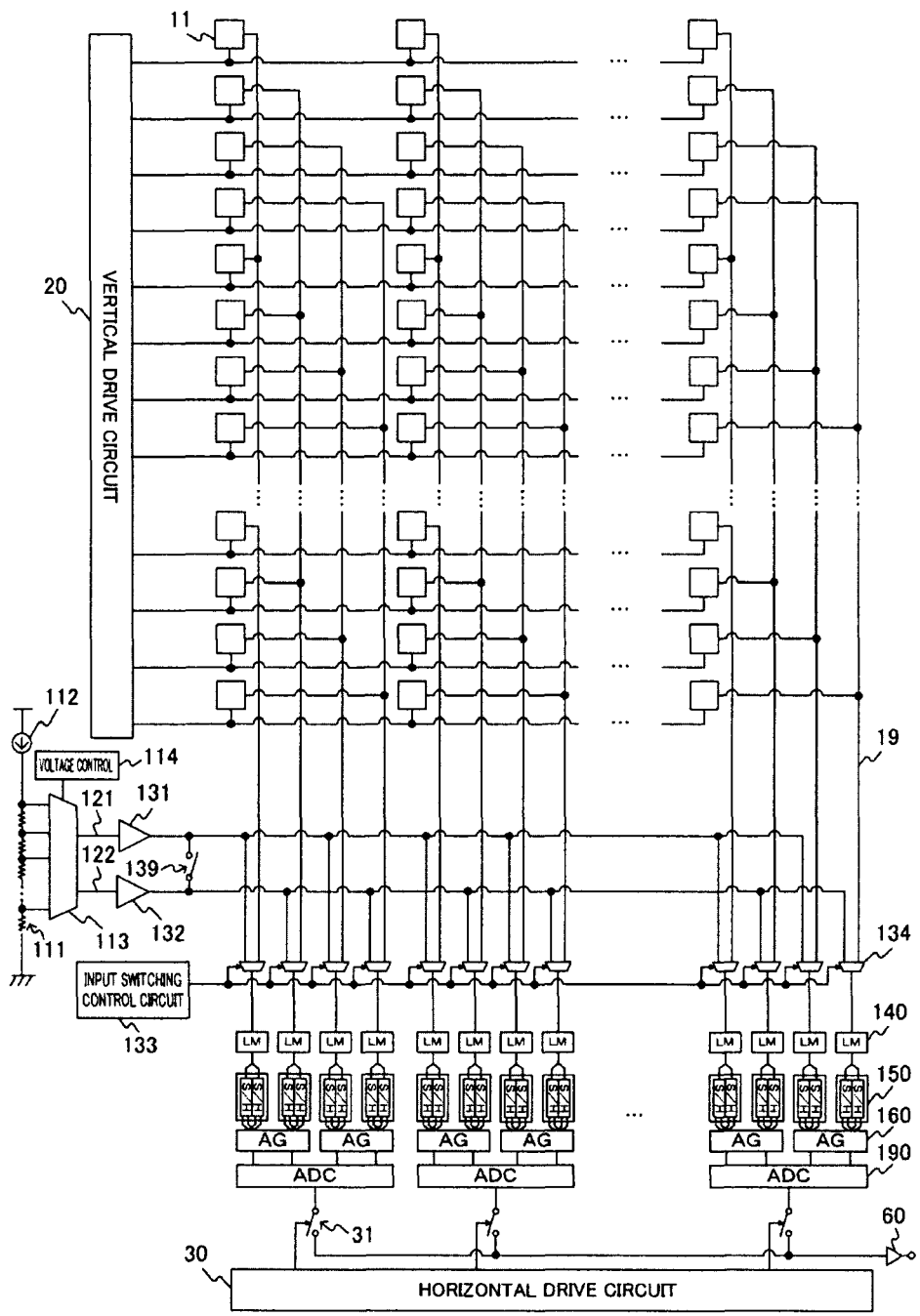
FIG. 7 is a diagram showing an overall configuration example of an imaging apparatus according to a second embodiment of the present technique.

FIG. 7 is a diagram showing an overall configuration example of an imaging apparatus according to a second embodiment of the present technique.

An overall configuration of the imaging apparatus according to the second embodiment is basically similar to that of the first embodiment described above. However, in the present example, one AD converter 190 is shared by four pixel columns and one analog gain circuit 160 is shared by two pixel columns. In other words, two analog gain circuits 160 are connected to one AD converter 190. In addition, a sample-and-hold unit 150 is connected between the load MOS 140 and the analog gain circuit 160 of each pixel column.

In other words, the present example adopts a configuration in which, with respect to one AD converter 190, two sets of the analog gain circuit 160 and two sample-and-hold units 150 that share the analog gain circuit 160 are provided. In addition, as described below, each of the sample-and-hold units 150 further includes two sample-and-hold circuits. In the present second embodiment, a single slope analog-digital converter is assumed as the AD converter 190 in a similar manner to the first embodiment described above.

[Column Signal Processing Circuit]

Figure 8:
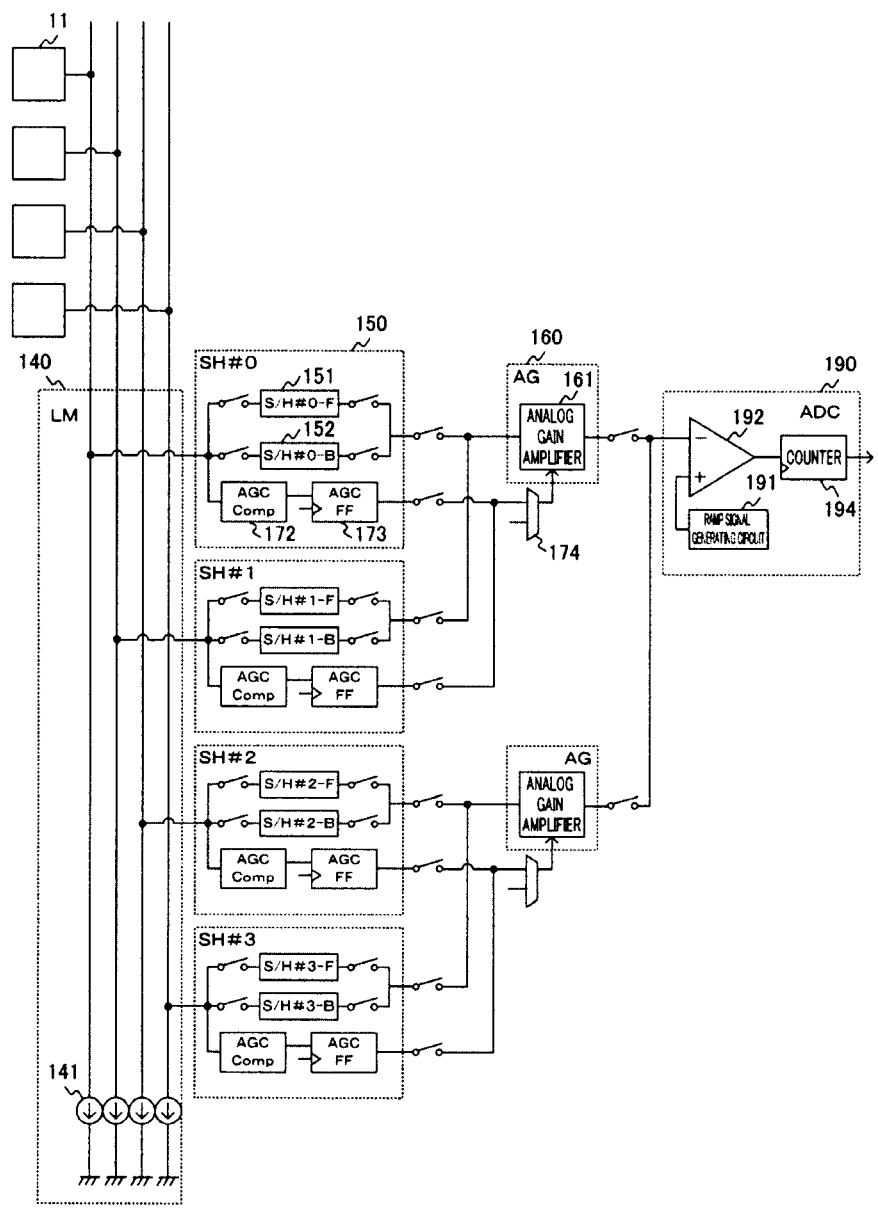
FIG. 8 is a diagram showing a configuration example of the column signal processing circuit 100 according to the second embodiment of the present technique.

FIG. 8 is a diagram showing a configuration example of the column signal processing circuit 100 according to the second embodiment of the present technique.

As described above, in the present example, two analog gain circuits 160 are connected to one AD converter 190 and, furthermore, two sample-and-hold units 150 are connected to each of the analog gain circuits 160. In the diagram, the four sample-and-hold units 150 connected to one AD converter 190 are distinguished as SH #0 to #3.

Each of the sample-and-hold units 150 includes two sample-and-hold circuits 151 and 152, the comparator 172, and the flip-flop 173. The sample-and-hold circuits 151 and 152 are holding circuits that alternately operate at opposing timings due to switches provided at input and output. For convenience's sake, the sample-and-hold circuit 151 is distinguished as foreground (F) and the sample-and-hold circuit 152 is distinguished as background (B). The comparator 172 and the flip-flop 173 are similar to those of the AGC comparator 170 explained in the first embodiment described above.

The analog gain circuit 160 includes the analog gain amplifier 161 in a similar manner to that explained in the first embodiment described above. Due to a switch provided on a data signal input side of the analog gain amplifier 161, a data signal from any of the two sample-and-hold units 150 is input. In addition, an output of the selector 174 is connected to a gain input side of the analog gain amplifier 161. The selector 174 is similar to that of the AGC comparator 170 explained in the first embodiment described above. However, due to a switch provided on an input side of the selector 174, a gain signal from any of the two sample-and-hold units 150 is input.

The AD converter 190 is similar to that of the first embodiment described above, includes the ramp signal generating circuit 191, the comparator 192, and the counter 194, and converts an analog input signal into a digital signal and outputs the converted digital signal.

Figure 9:
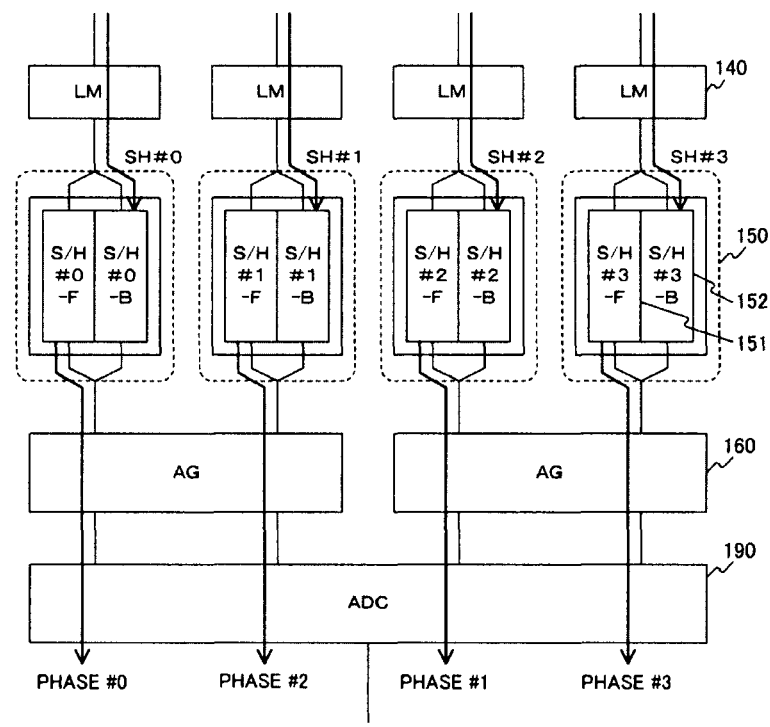
FIG. 9 is a diagram showing a flow of data of the column signal processing circuit 100 according to the second embodiment of the present technique.

FIG. 9 is a diagram showing a flow of data of the column signal processing circuit 100 according to the second embodiment of the present technique.

As described above, in each of the sample-and-hold units 150, one sample-and-hold circuit 151 is considered to be in the foreground and the other sample-and-hold circuit 152 is considered to be in the background and the sample-and-hold circuits are assumed to operate alternately. In other words, while data held in one of the sample-and-hold circuits is being subjected to AD conversion in the background, a next data signal is simultaneously sampled in parallel by the other sample-and-hold circuit. From an opposite perspective, while a data signal is being sampled in one of the sample-and-hold circuits, data being held in the other sample-and-hold circuit is subjected to AD conversion.

In these operations, AD conversion is performed in a time-shared manner by sharing the AD converter 190 and the two analog gain circuits 160. In other words, one AD converter 190 subjects four analog signals from the four sample-and-hold units 150 in one horizontal detection period to AD conversion performed divided into four phases #0 to #3.

[Operation]

Figure 10:
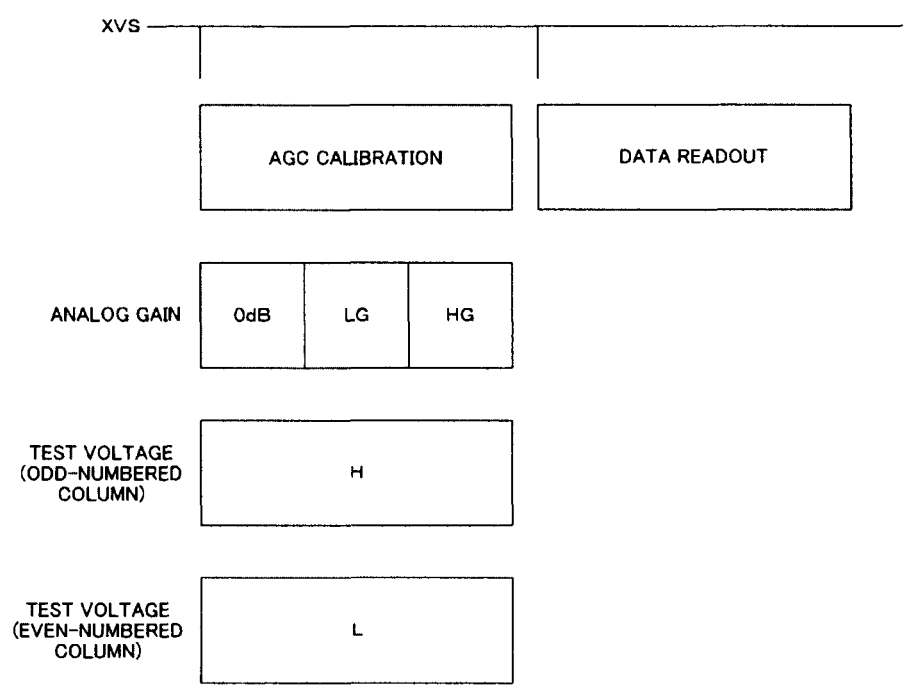
FIG. 10 is a diagram showing an operation timing example of calibration according to the second embodiment of the present technique.

FIG. 10 is a diagram showing an operation timing example of calibration according to the second embodiment of the present technique.

As described above, in the present second embodiment, four analog signals from the four sample-and-hold units 150 in one horizontal detection period are subjected to AD conversion by being divided into four phases #0 to #3. During calibration, an odd-numbered column is supplied with the potential VH of high illumination data and, at the same time, an even-numbered column is supplied with the potential VL of low illumination data. In addition, AD conversion of the potential VH of high illumination data is performed in phases #0 and #1 and AD conversion of the potential VL of low illumination data is performed in phases #2 and #3.

By performing AD conversion of the potential VH of high illumination data and the potential VL of low illumination data by dividing into phases during calibration, data of both potentials VH and VL can be acquired in a time-shared manner for each gain in one AD converter 190. In other words, since the AD converter 190 is sequentially supplied with the potentials VH and VL in each phase, an acquisition time of test data can be reduced without having to switch test voltages in each of an odd-numbered column and an even-numbered column as in the first embodiment described above.

Figure 11:
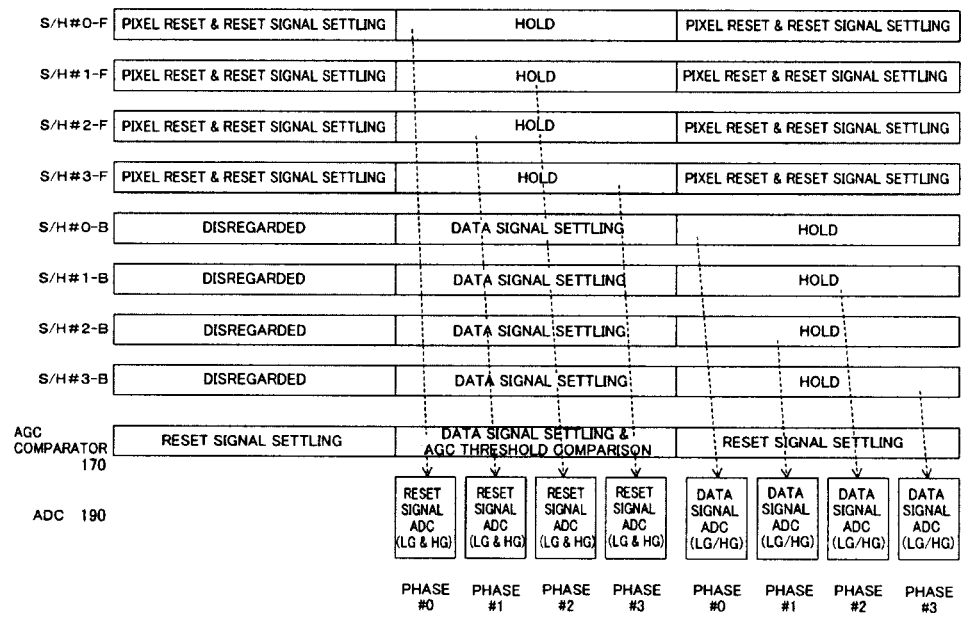
FIG. 11 is a diagram showing an operation timing example of the imaging apparatus according to the second embodiment of the present technique.

FIG. 11 is a diagram showing an operation timing example of the imaging apparatus according to the second embodiment of the present technique.

Pixel reset is performed prior to reading out a data signal. In other words, in the pixel 11, an electric charge is reset and time is secured for a voltage value of the vertical signal line 19 to settle due to the reset. In this case, it is assumed that a reset signal is to be held in the four sample-and-hold circuits 151 in the four sample-and-hold units 150. At this point, settling due to the reset is also performed in a similar manner in the AGC comparator 170.

In a next cycle, with respect to the reset signals held by the four sample-and-hold circuits 151, AD conversion is performed in the AD converter 190 by dividing into four phases #0 to #3. In other words, a signal from SH #0 is subjected to AD conversion in phase #0, a signal from SH #2 is subjected to AD conversion in phase #1, a signal from SH #1 is subjected to AD conversion in phase #2, and a signal from SH #3 is subjected to AD conversion in phase #3. This readout order is adopted for the purpose of avoiding a collision in the analog gain circuit 160.

During AD conversion, although a gain is selected based on a comparison result of the AGC comparator 170 upon readout of pixel data, since a determination thereof has not yet been performed by the time point of AD conversion of a reset signal, gain adjustment is performed at both high gain and low gain in the analog gain circuit 160.

In parallel with the AD conversion of the reset signal, in the pixel 11, an exposed electric charge is transferred as a data signal and time for settling of a voltage value of the vertical signal line 19 due to the data signal is secured. In this case, it is assumed that the data signal is held in the four sample-and-hold circuits 152 in the four sample-and-hold units 150. At this point, a comparison between an input voltage value and the AGC threshold is performed by the comparator 172 and a comparison result thereof is held in the flip-flop 173.

In a next cycle, with respect to data signals held by the four sample-and-hold circuits 152s, AD conversion is performed in the AD converter 190 by dividing into four phases #0 to #3. In other words, a signal from SH #0 is subjected to AD conversion in phase #0, a signal from SH #2 is subjected to AD conversion in phase #1, a signal from SH #1 is subjected to AD conversion in phase #2, and a signal from SH #3 is subjected to AD conversion in phase #3.

During the AD conversion, a gain is selected based on a comparison result of the AGC comparator 170 upon readout of pixel data. On the other hand, during calibration, a comparison result with the AGC threshold is not used and a manually-set value is selected by the selector 174. In other words, a high gain is set in the case of a high-gain calibration and a low gain is set in the case of a low-gain calibration.

As described above, according to the second embodiment of the present technique, by performing AD conversion of the potential VH of high illumination data and the potential VL of low illumination data by dividing into phases, an acquisition time of test data can be reduced without having to switch test voltages during calibration.

3. Third Embodiment

While a single slope analog-digital converter is assumed as the AD converter 190 in the first embodiment described above, in the present third embodiment, a current-input type analog-digital converter is assumed as the AD converter 190. Specific examples of the current-input type analog-digital converter include a delta-sigma AD converter.

[Imaging Apparatus]

Figure 12:
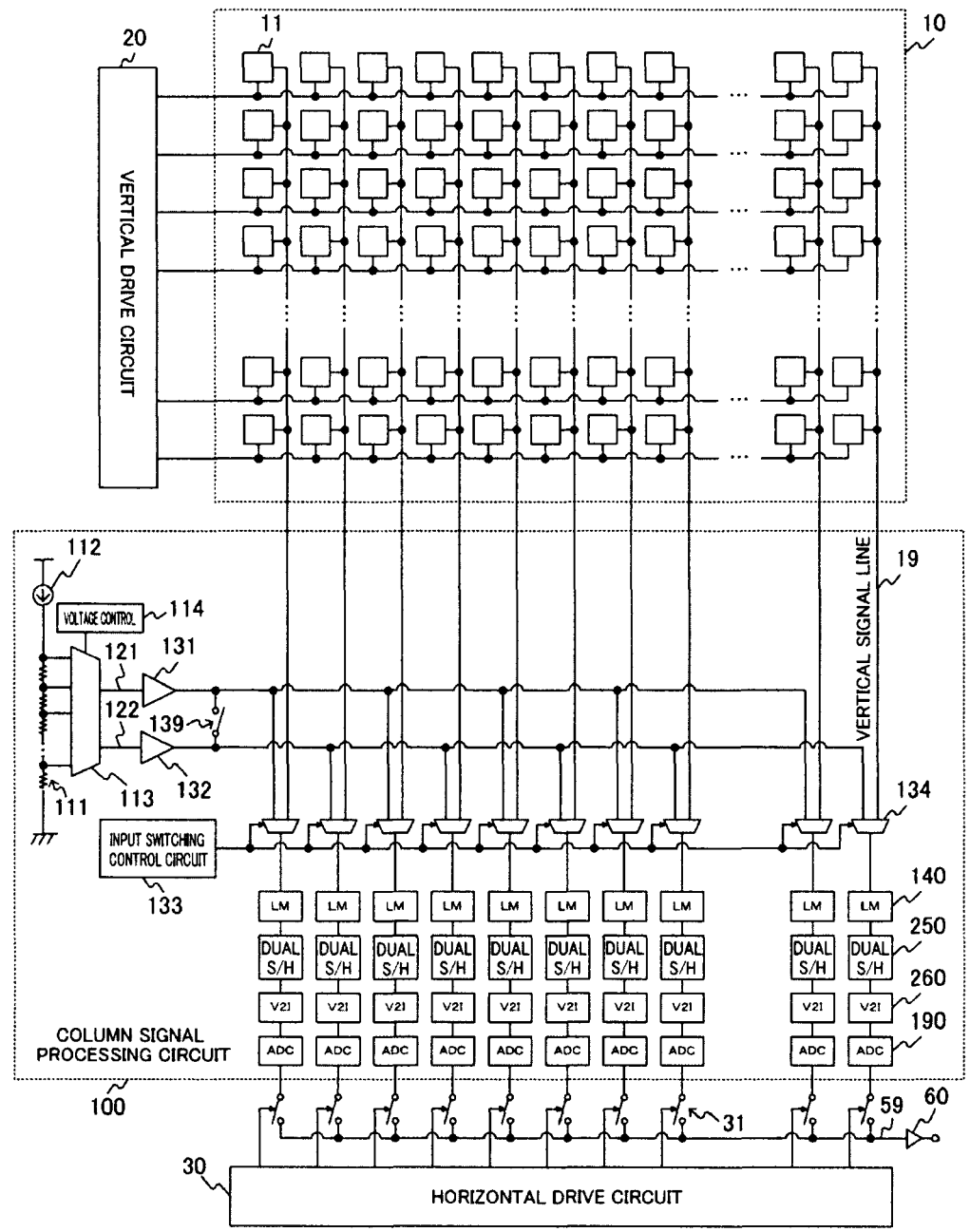
FIG. 12 is a diagram showing an overall configuration example of an imaging apparatus according to a third embodiment of the present technique.

FIG. 12 is a diagram showing an overall configuration example of an imaging apparatus according to a third embodiment of the present technique.

An overall configuration of the imaging apparatus according to the third embodiment is basically similar to that of the first embodiment described above. However, since the premise is to use a current-input type analog-digital converter as the AD converter 190, the imaging apparatus includes a dual sample-and-hold unit 250 and a voltage-to-current converter (V2I) 260 in place of the analog gain circuit 160.

The dual sample-and-hold unit 250 holds each of a reset signal and a data signal of the vertical signal line 19 as a voltage.

The voltage-to-current converter 260 converts a difference in voltages (a potential difference) of the reset signal and the data signal held in the dual sample-and-hold unit 250 into a current. In the voltage-to-current converter 260, analog correlated double sampling (analog CDS) is performed by using the potential difference between the reset signal and the data signal held in the dual sample-and-hold unit 250. Accordingly, a fixed pattern noise unique to the pixel 11 can be removed.

In the voltage-to-current converter 260, when converting a potential difference into a current, level control is performed with a predetermined gain. Therefore, in a similar manner to the analog gain circuit 160 in the first and second embodiments described above, calibration between high gain and low gain must be performed in order to correct a gain ratio deviation between the gains. As a result, the imaging apparatus according to the third embodiment also includes a test voltage generating circuit to output a test voltage. It should be noted that the voltage-to-current converter 260 is an example of the level control circuit described in the claims.

An operation timing of calibration of the imaging apparatus according to the third embodiment is similar to that of the first embodiment described above. In other words, with respect to a total of three gains including 0 dB gain to be a reference in addition to a low gain and a high gain of the voltage-to-current converter 260, the potential VH of high illumination data and the potential VL of low illumination data are to be used as test voltage. In doing so, performing parallel operations by using mutually different voltage signals as test voltages between an odd-numbered column and an even-numbered column, acquisition time of test data can be reduced.

[Column Signal Processing Circuit]

Figure 13:
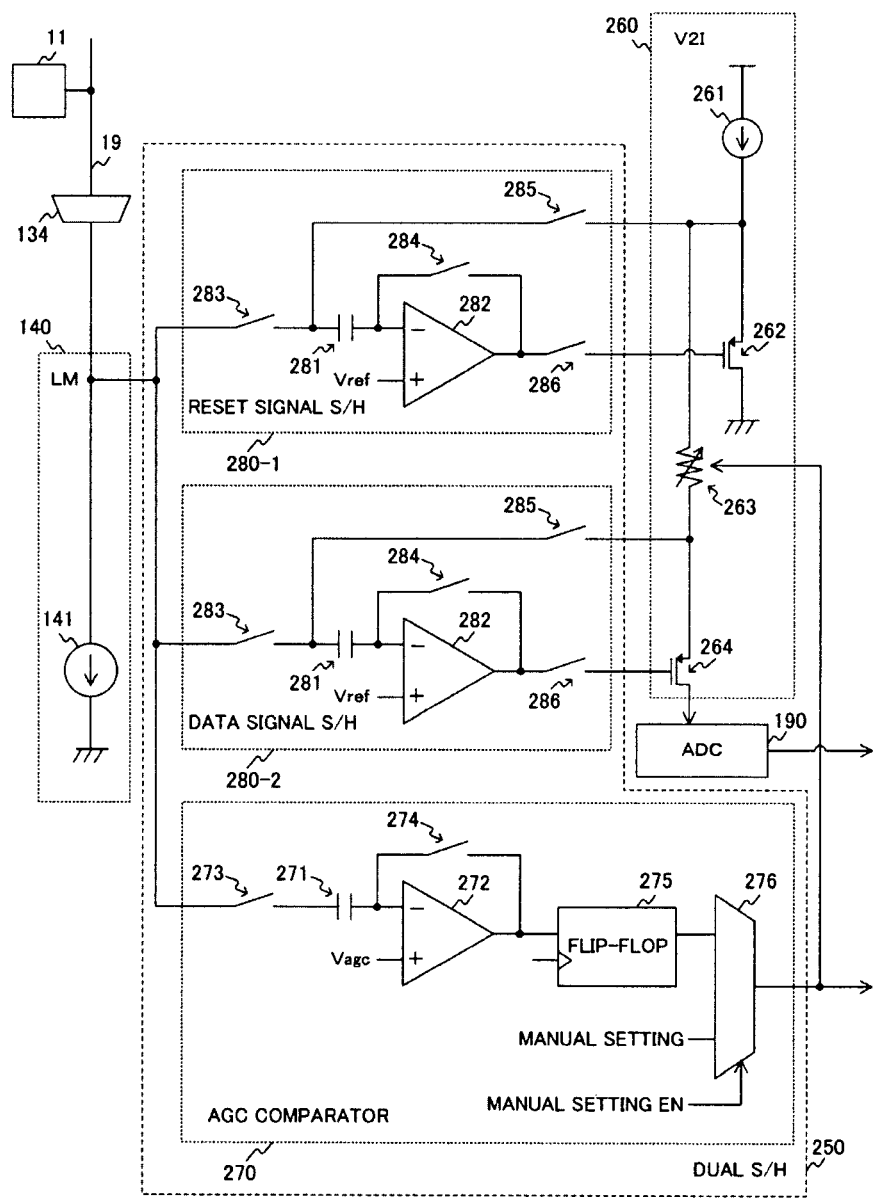
FIG. 13 is a diagram showing a configuration example of the column signal processing circuit 100 according to the third embodiment of the present technique.

FIG. 13 is a diagram showing a configuration example of the column signal processing circuit 100 according to the third embodiment of the present technique.

As described above, in the present example, a current-input type analog-digital converter is assumed as the AD converter 190 and the imaging apparatus includes the dual sample-and-hold unit 250 and the voltage-to-current converter 260. The dual sample-and-hold unit 250 includes a reset signal sample-and-hold unit 280-1, a data signal sample-and-hold unit 280-2, and an AGC comparator 270.

The reset signal sample-and-hold unit 280-1 and the data signal sample-and-hold unit 280-2 are both configured as switched capacitors and each includes a sampling capacitor 281, a differential amplifier 282, and switches 283 to 286.

The reset signal sample-and-hold unit 280-1 holds a reset signal. The switches 283 and 284 are turned on during a reset period (t1). At this point, a difference "Vin(t1)–Vref" between a voltage Vin(t1) during the reset period and a reference potential Vref is applied to the sampling capacitor 281 and a voltage thereof is held. Subsequently, when the switches 285 and 286 are turned on, the voltage-to-current converter 260 is supplied with the voltage of the reset signal.

The data signal sample-and-hold unit 280-2 holds a data signal. The switches 283 and 284 are turned on during a data sampling period (t2). At this point, a difference "Vin(t2)–Vref" between a voltage Vin(t2) during the reset period and the reference potential Vref is applied to the sampling capacitor 281 and a voltage thereof is held. Subsequently, when the switches 285 and 286 are turned on, the voltage-to-current converter 260 is supplied with the voltage of the data signal.

The AGC comparator 270 is a switched capacitor-type comparator that performs adaptive gain control (AGC) and includes a sampling capacitor 271, a differential amplifier 272, switches 273 and 274, a flip-flop 275, and a selector 276.

During the reset period (t1), the switches 273 and 274 are turned on and an electric charge is accumulated in the sampling capacitor 271. In addition, during the data sampling period (t2), the switch 273 is turned on but the switch 274 is turned off. Accordingly, a potential difference (Vin(t1)–Vin(t2)) between the voltage Vin(t1) during the reset period (t1) and the voltage Vin(t2) during the data sampling period (t2) is held in the sampling capacitor 271. Subsequently, the potential difference and a threshold Vagc are compared with each other and, for example, "1 (high illumination)" is generated as a determination result when "Vin(t1)–Vin(t2)>Vagc" and "0 (low illumination)" is generated as a determination result when "Vin(t1)–Vin(t2)<Vagc", and the determination result is held in the flip-flop 275.

The selector 276 selects any one of a value held in the flip-flop 275 and a manually-set value in accordance with a selection signal (manual setting EN) and supplies the voltage-to-current converter 260 with the selected value. While the voltage-to-current converter 260 is supplied with the value held in the flip-flop 275 with respect to a normal data signal, when performing a calibration between gains, a manually-set value is to be used as will be described later.

The voltage-to-current converter 260 includes a current source 261, transistors 262 and 264, and a variable resistor 263. When the switches 285 and 286 of the reset signal sample-and-hold unit 280-1 are turned on, a voltage of a reset signal is applied between a gate and a source of the transistor 262. In addition, when the switches 285 and 286 of the data signal sample-and-hold unit 280-2 are turned on, a voltage of a data signal is applied between a gate and a source of the transistor 264.

The variable resistor 263 is provided on a path from the current source 261 to the AD converter 190 and, due to a resistance value of the variable resistor 263, the AD converter 190 is supplied with a current corresponding to a potential difference between the voltage of the reset signal and the data signal. A control signal of the variable resistor 263 is supplied from the AGC comparator 270. For example, the variable resistor 263 is supplied with a low gain (LG) control signal in the case of "1 (high illumination)" but supplied with a high gain (HG) control signal in the case of "0 (low illumination)", and a resistance value corresponding to the control signal is selected.

[Operation]

Figure 14:
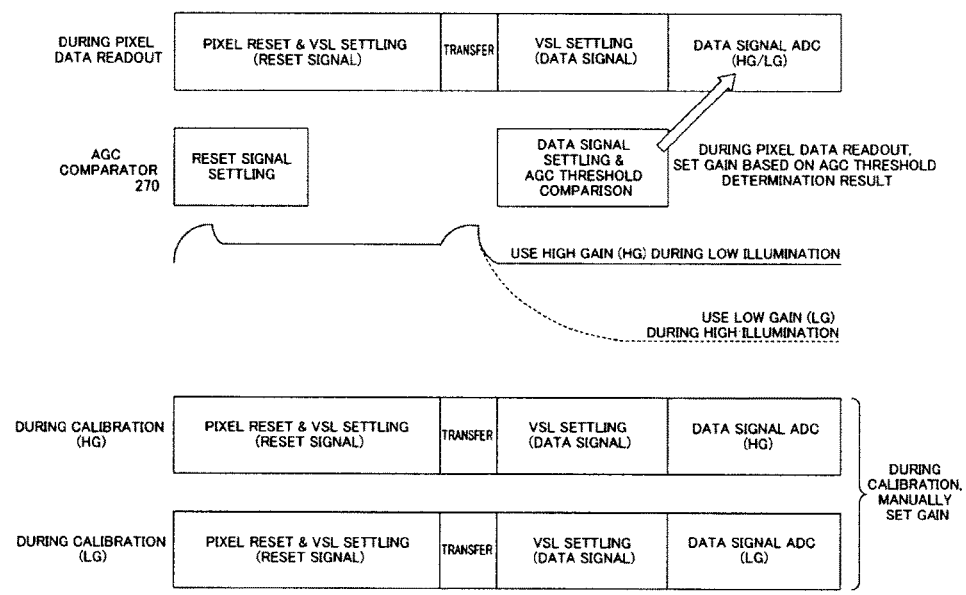
FIG. 14 is a diagram showing an operation timing example of the imaging apparatus according to the third embodiment of the present technique.

FIG. 14 is a diagram showing an operation timing example of the imaging apparatus according to the third embodiment of the present technique.

Pixel reset is performed prior to reading out a data signal. In other words, in the pixel 11, an electric charge is reset and time is secured for a voltage value of the vertical signal line 19 to settle due to the reset. At this point, a settling time due to the reset is also performed in a similar manner in the AGC comparator 270.

Subsequently, in the pixel 11, exposed electric charge is transferred as a data signal and time for the voltage value of the vertical signal line 19 to settle due to the data signal is secured. At this point, an input voltage value and the AGC threshold are compared with each other by the comparator 272 of the AGC comparator 270 and a comparison result thereof is held by the flip-flop 275.

Subsequently, the voltage-to-current converter 260 converts the potential difference between the reset signal and the data signal into a current. In doing so, in the voltage-to-current converter 260, gain adjustment is performed at any of a high gain and a low gain in accordance with a comparison result of the AGC comparator 270. In other words, gain adjustment is performed by the voltage-to-current converter 260 using high gain in the case of low illumination but using low gain in the case of high illumination and AD conversion by the AD converter 190 is performed.

On the other hand, during calibration, a comparison result with the AGC threshold is not used and a manually-set value is selected by the selector 276. In other words, a high gain is set in the case of a high-gain calibration and a low gain is set in the case of a low-gain calibration.

As described above, according to the third embodiment of the present technique, a technique similar to that of the first embodiment which assumes a single slope analog-digital converter can also be utilized when adopting a current-input type analog-digital converter as the AD converter 190.

4. Fourth Embodiment

While a single slope analog-digital converter is assumed as the AD converter 190 in the second embodiment described above, in a present fourth embodiment, a current-input type analog-digital converter is assumed as the AD converter 190.

[Imaging Apparatus]

Figure 15:
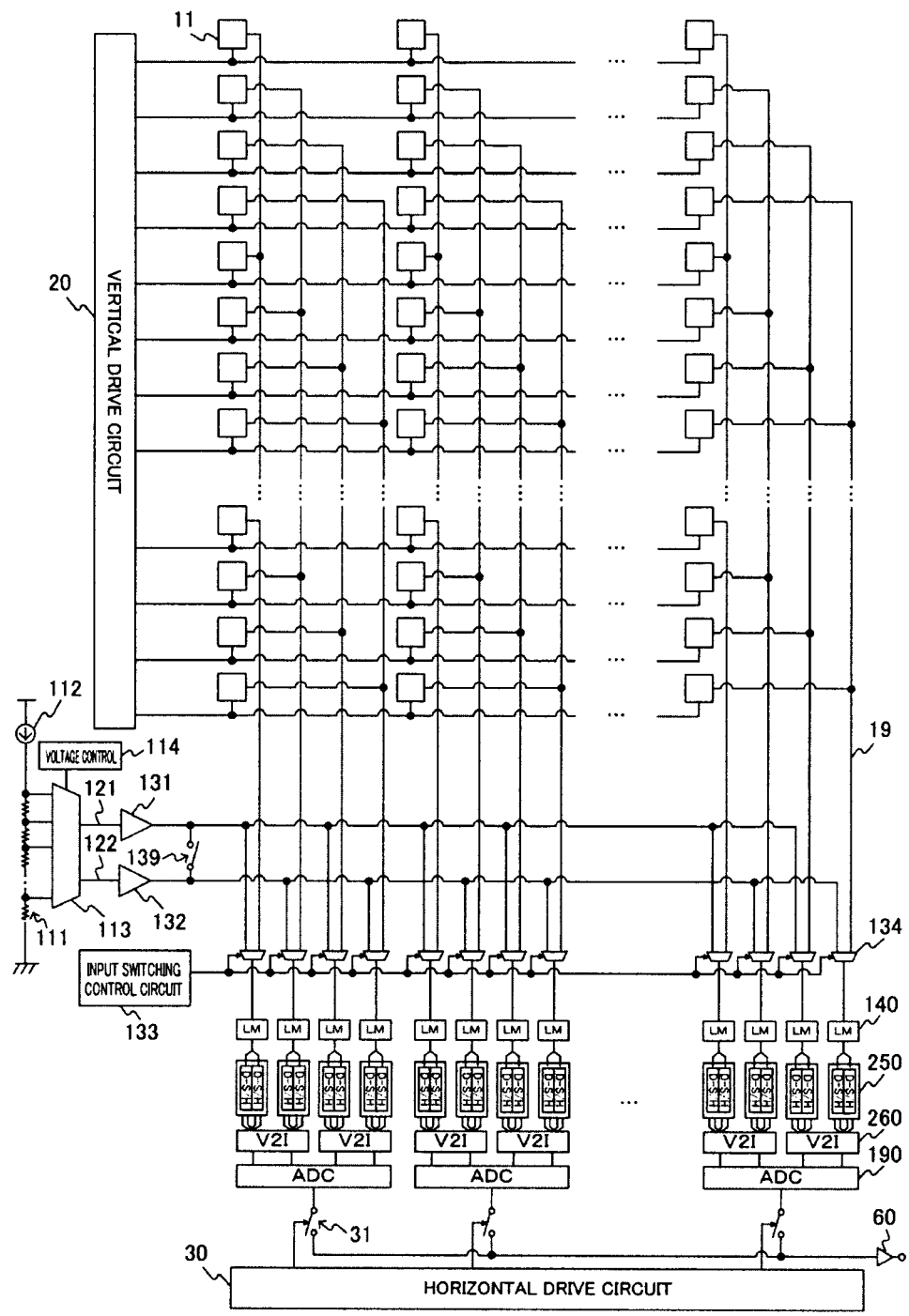
FIG. 15 is a diagram showing an overall configuration example of an imaging apparatus according to a fourth embodiment of the present technique.

FIG. 15 is a diagram showing an overall configuration example of an imaging apparatus according to the fourth embodiment of the present technique.

An overall configuration of the imaging apparatus according to the present fourth embodiment is basically similar to that of the second embodiment described above. However, since the present fourth embodiment assumes the use of a current-input type analog-digital converter as the AD converter 190, in a similar manner to the third embodiment, the imaging apparatus includes the dual sample-and-hold unit 250 and the voltage-to-current converter (V2I) 260 in place of the analog gain circuit 160.

In addition, in the present example, one AD converter 190 is shared by four pixel columns and one voltage-to-current converter 260 is shared by two pixel columns. In other words, two voltage-to-current converters 260 are connected to one AD converter 190. In addition, between the load MOS 140 and the voltage-to-current converter 260 of each pixel column, two dual sample-and-hold units 250 are connected to one load MOS 140.

In other words, the present example adopts a configuration in which, with respect to one AD converter 190, two sets of the voltage-to-current converter 260 and four dual sample-and-hold units 250 that share the voltage-to-current converter 260 are provided.

An operation timing of calibration of the imaging apparatus according to the fourth embodiment is similar to that of the second embodiment described above. In other words, four analog signals from the four dual sample-and-hold units 250 in one horizontal detection period are subjected to AD conversion by being divided into four phases #0 to #3. During calibration, an odd-numbered column is supplied with the potential VH of high illumination data and, at the same time, an even-numbered column is supplied with the potential VL of low illumination data. In addition, AD conversion of the potential VH of high illumination data is performed in phases #0 and #1 and AD conversion of the potential VL of low illumination data is performed in phases #2 and #3. Accordingly, since the AD converter 190 is sequentially supplied with the potentials VH and VL in each phase, an acquisition time of test data can be reduced without having to switch test voltages in each of an odd-numbered column and an even-numbered column as in the first and third embodiments described above.

[Column Signal Processing Circuit]

Figure 16:
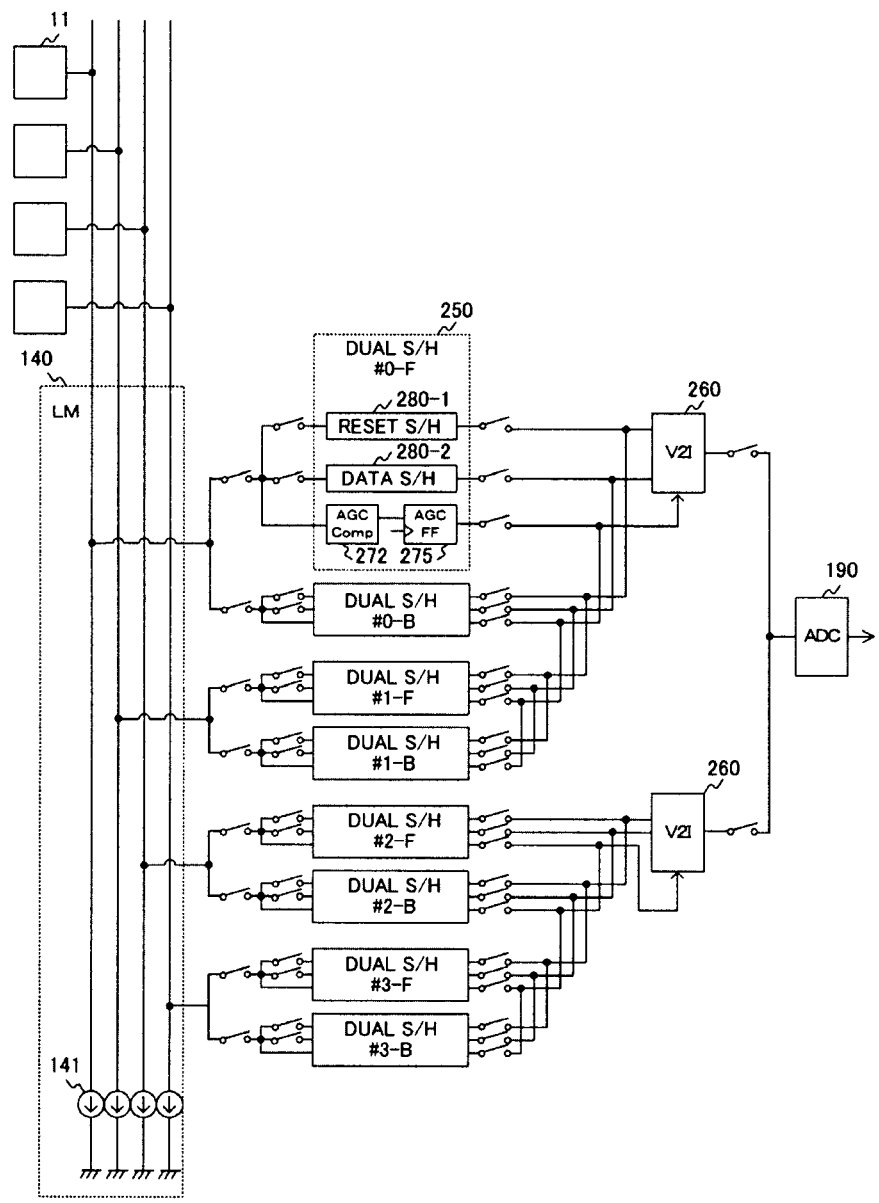
FIG. 16 is a diagram showing a configuration example of the column signal processing circuit 100 according to the fourth embodiment of the present technique.

FIG. 16 is a diagram showing a configuration example of the column signal processing circuit 100 according to the fourth embodiment of the present technique.

As described above, in the present example, two voltage-to-current converters 260 are connected to one AD converter 190 and, furthermore, four dual sample-and-hold units 250 are connected to each of the voltage-to-current converters 260. In the diagram, the eight dual sample-and-hold units 250 to be connected to one AD converter 190 are divided into foreground (F) and background (B) in a similar manner to the second embodiment and distinguished as dual S/H #0-F, #0-B, #1-F, #1-B, #2-F, #2-B, #3-F, and #3-B. Other components of the dual sample-and-hold unit 250 are the same as those in the third embodiment described above.

Figure 17:
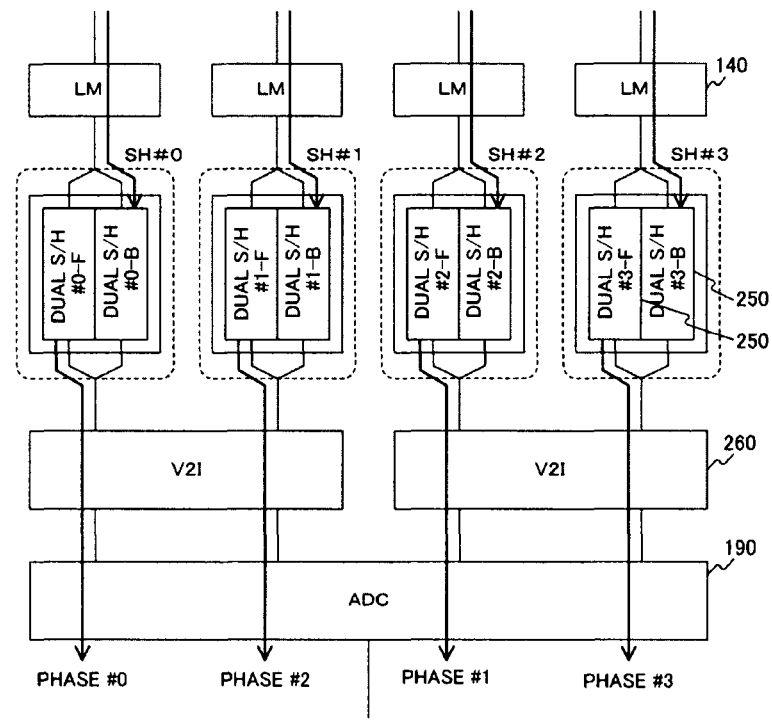
FIG. 17 is a diagram showing a flow of data of the column signal processing circuit 100 according to the fourth embodiment of the present technique.

FIG. 17 is a diagram showing a flow of data of the column signal processing circuit 100 according to the fourth embodiment of the present technique.

As described above, the dual sample-and-hold units 250 are divided into foreground (F) and background (B) and are assumed to operate alternately. In other words, while data held in one of the dual sample-and-hold units 250 is being subjected to AD conversion in the background, a next piece of data is simultaneously sampled in parallel by the other dual sample-and-hold unit 250. From an opposite perspective, while data is being sampled in one of the dual sample-and-hold units 250, data being held in the other dual sample-and-hold unit 250 is subjected to AD conversion.

In these operations, AD conversion is performed in a time-shared manner by sharing the AD converter 190 and the two voltage-to-current converters 260. In other words, one AD converter 190 subjects four analog signals from the four dual sample-and-hold units 250 in one horizontal detection period to AD conversion performed divided into four phases #0 to #3.

[Operation]

Figure 18:
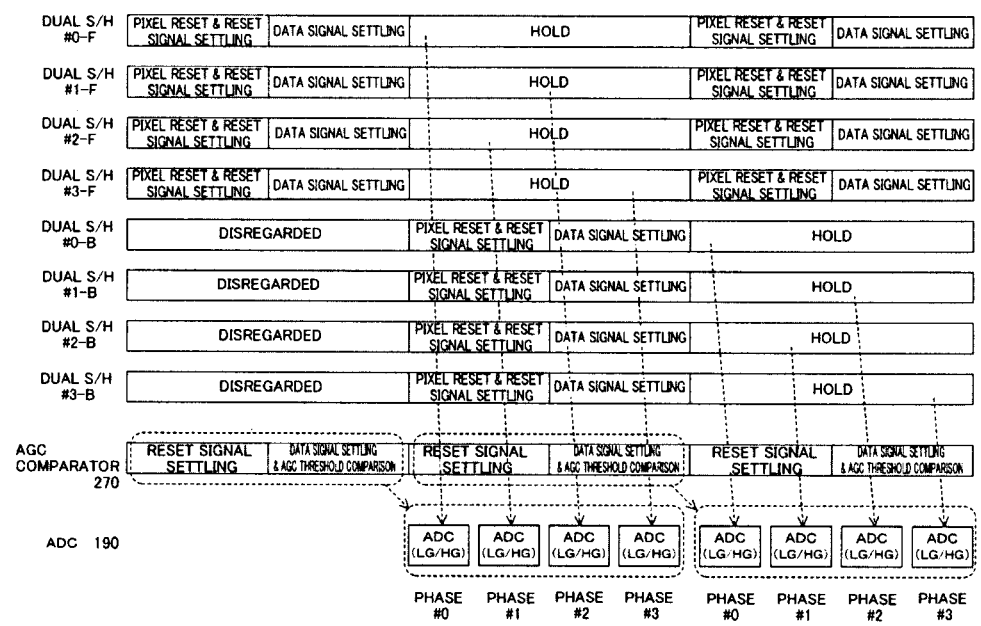
FIG. 18 is a diagram showing an operation timing example of the imaging apparatus according to the fourth embodiment of the present technique.

FIG. 18 is a diagram showing an operation timing example of the imaging apparatus according to the fourth embodiment of the present technique.

Pixel reset is performed prior to reading out a data signal. In other words, in the pixel 11, an electric charge is reset and time is secured for a voltage value of the vertical signal line 19 to settle due to the reset. In this case, it is assumed that the reset signal is to be held by the four dual sample-and-hold units 250. At this point, settling due to the reset is also performed in a similar manner in the AGC comparator 270.

In addition, time is secured for the data signal to settle. In this case, it is assumed that the data signal is to be held by the four dual sample-and-hold units 250. At this point, settling of the data signal is also performed in a similar manner in the AGC comparator 270 and the data signal is compared with a threshold.

In a next cycle, using the reset signal and the data signal respectively held in the four dual sample-and-hold units 250 and a comparison result in the AGC comparator 270, an analog gain adjustment at any of a low gain and a high gain is performed in the voltage-to-current converter 260. In addition, AD conversion is performed divided into four phases #0 to #3 in the AD converter 190. In other words, a signal from dual S/H #0-F is subjected to AD conversion in phase #0, a signal from dual S/H #2-F is subjected to AD conversion in phase #1, a signal from dual S/H #1-F is subjected to AD conversion in phase #2, and a signal from dual S/H #3-F is subjected to AD conversion in phase #3. This readout order is adopted for the purpose of avoiding a collision in the voltage-to-current converter 260.

In this cycle, in parallel with AD conversion based on the reset signal and the data signal respectively held in the four dual sample-and-hold units 250, reset of a pixel, settling of the pixel, and settling of a data signal are newly performed in the other four dual sample-and-hold units 250. At this point, settling of the data signal is also performed in a similar manner in the AGC comparator 270 and the data signal is compared with a threshold.

In a next cycle, using the reset signal and the data signal respectively held in the four dual sample-and-hold units 250 in the previous cycle and a comparison result in the AGC comparator 270, an analog gain adjustment at any of a low gain and a high gain is performed in the voltage-to-current converter 260. In addition, AD conversion is performed divided into four phases #0 to #3 in the AD converter 190. In other words, a signal from dual S/H #0-B is subjected to AD conversion in phase #0, a signal from dual S/H #2-B is subjected to AD conversion in phase #1, a signal from dual S/H #1-B is subjected to AD conversion in phase #2, and a signal from dual S/H #3-B is subjected to AD conversion in phase #3. Similar processing is repetitively performed thereafter by alternately reversing the roles of foreground and background.

As described above, according to the fourth embodiment of the present technique, a technique similar to that of the second embodiment which assumes a single slope analog-digital converter can also be utilized when adopting a current-input type analog-digital converter as the AD converter 190.

It should be noted that the above-described embodiments show examples for embodying the present technique, and matters in the embodiments and matters specifying the invention in the claims have a corresponding relationship with each other. Similarly, the matters specifying the invention in the claims and the matters in the embodiments of the present technique having the same name have a corresponding relationship with each other. However, the present technique is not limited to the embodiments and can be embodied by applying various modifications to the embodiments without departing from the gist thereof.

In addition, the effects described in the present specification are merely examples and are not intended as limiting, and other effects may be obtained.

The present technique can also be configured as follows.

(1) An imaging apparatus, including:
   a level control circuit configured to perform, using any of first and second gains that differ from each other, level control of an analog signal output to a vertical signal line that corresponds to each column of a pixel array;
   an analog-digital converter configured to convert the level-controlled analog signal into a digital signal;
   a test signal generating unit configured to generate first and second test signals that differ from each other; and
   a gain ratio acquiring unit configured to simultaneously supply one of the vertical signal lines with the first test signal and supply another of the vertical signal lines with the second test signal to acquire a gain ratio between the first gain and the second gain of the level control circuit.

(2) The imaging apparatus according to (1), further including:
   a gain ratio correction value generating unit configured to generate a gain ratio correction value based on the acquired gain ratio; and
   a correcting unit configured to correct the digital signal in accordance with the gain ratio correction value generated by the gain ratio correction value generating unit.

(3) The imaging apparatus according to (1) or (2), wherein the test signal generating unit is configured to generate a potential of high illumination data as the first test signal and to generate a potential of low illumination data as the second test signal.

(4) The imaging apparatus according to any one of (1) to (3), wherein the one of the vertical signal lines is a vertical signal line of an odd-numbered column, and the other of the vertical signal lines is a vertical signal line of an even-numbered column.

(5) The imaging apparatus according to any one of (1) to (3), wherein for each gain of the level control circuit respectively set to 0 dB, the first gain, and the second gain, the gain ratio acquiring unit is configured to acquire the gain ratio by simultaneously supplying the one of the vertical signal lines with the first test signal and supplying the other of the vertical signal lines with the second test signal and subsequently simultaneously supplying the one of the vertical signal lines with the second test signal and supplying the other of the vertical signal lines with the first test signal.

(6) The imaging apparatus according to any one of (1) to (5), wherein the analog-digital converter is provided for each of the plurality of vertical signal lines, and the gain ratio acquiring unit is configured to simultaneously supply the one of the vertical signal lines with the first test signal and supply the other of the vertical signal lines with the second test signal and, for each gain of the level control circuit respectively set to 0 dB, the first gain, and the second gain, acquire the gain ratio by sequentially selecting the first and second test signals supplied to any of the one of the vertical signal lines and the other of the vertical signal lines.

(7) The imaging apparatus according to (6), further including:
a first sample-and-hold unit configured to hold an analog signal output to the one of the vertical signal lines, and
a second sample-and-hold unit configured to hold an analog signal output to the other of the vertical signal lines, wherein
the level control circuit is configured to sequentially perform the level control with respect to an output of any of the first and second sample-and-hold units, and
the analog-digital converter is configured to sequentially perform AD conversion with respect to the plurality of outputs of the level control circuit.

(8) The imaging apparatus according to (7), wherein each of the first and second sample-and-hold units includes two alternately operating sample-and-hold circuits.

(9) The imaging apparatus according to any one of (1) to (5), wherein the level control circuit is an analog gain circuit configured to output a voltage signal obtained by subjecting the analog signal to level control, and the analog-digital converter is a single slope analog-digital converter.

(10) The imaging apparatus according to any one of (1) to (4) or (6) to (8), wherein the level control circuit is a voltage-to-current converter configured to output a current signal obtained by subjecting the analog signal to level control, and the analog-digital converter is a current-input type analog-digital converter configured to convert the current signal into the digital signal.

(11) A gain ratio acquisition method in an imaging apparatus including a level control circuit which performs, using any of first and second gains that differ from each other, level control of an analog signal output to a vertical signal line that corresponds to each column of a pixel array, an analog-digital converter which converts the level-controlled analog signal into a digital signal, and a test signal generating unit which generates first and second test signals that differ from each other, the imaging apparatus simultaneously performing:
a step of supplying one of the vertical signal lines with the first test signal to acquire a gain ratio between the first gain and the second gain of the level control circuit; and
a step of supplying another of the vertical signal lines with the second test signal to acquire a gain ratio between the first gain and the second gain of the level control circuit.

REFERENCE SIGNS LIST

10 Pixel array
11 Pixel
19 Vertical signal line (VSL)
20 Vertical drive circuit
30 Horizontal drive circuit
31 Switch
59 Horizontal signal line
60 Output circuit
100 Column signal processing circuit
110 Test voltage generating circuit
111 Resistor
112 Current source
113 Selector
114 Voltage control register
131, 132 Output buffer
133 Input switching control circuit
134 Selector
139 Switch
141 Current source
150 Sample-and-hold unit
151, 152 Sample-and-hold circuit
160 Analog gain circuit
161 Analog gain amplifier
170 AGC (Adaptive Gain Control) comparator
172 Comparator
173 Flip-flop
174 Selector
190 AD (Analog to Digital) converter
191 Ramp signal generating circuit
192 Comparator
194 Counter
250 Dual sample-and-hold unit
260 Voltage-to-current converter (V2I)
310 Switch
320 Correction value calculating circuit
321 Gain ratio correction value calculating circuit
322 Correction memory
324 Gain ratio correction value
330 Correcting circuit
331 Line buffer
332 Multiplier

The invention claimed is:

1. An imaging apparatus, comprising:
a level control circuit configured to perform, using any of a first gain and a second gain that differ from each other, level control of an analog signal output to a vertical signal line of a plurality of vertical signal lines that corresponds to each column of a pixel array;
an analog-digital converter configured to convert the level-controlled analog signal into a digital signal;
a test signal generating unit configured to generate a first test signal and a second test signal that differ from each other; and
a gain ratio acquiring unit configured to simultaneously supply one of the plurality of vertical signal lines with the first test signal and supply another of the plurality of vertical signal lines with the second test signal to acquire a gain ratio between the first gain and the second gain of the level control circuit.

2. The imaging apparatus according to claim 1, further comprising:
a gain ratio correction value generating unit configured to generate a gain ratio correction value based on the acquired gain ratio; and
a correcting unit configured to correct the digital signal in accordance with the gain ratio correction value generated by the gain ratio correction value generating unit.

3. The imaging apparatus according to claim 1, wherein the test signal generating unit is further configured to generate a potential of high illumination data as the first test signal and to generate a potential of low illumination data as the second test signal.

4. The imaging apparatus according to claim 1, wherein the one of the plurality of vertical signal lines is a vertical signal line of an odd-numbered column, and
the other of the plurality of vertical signal lines is a vertical signal line of an even-numbered column.

5. The imaging apparatus according to claim 1, wherein for each gain of the level control circuit respectively set to 0 dB, the first gain, and the second gain, the gain ratio acquiring unit is further configured to acquire the gain ratio by simultaneously supplying the one of the plurality of vertical signal lines with the first test signal and supplying the other of the plurality of vertical signal lines with the second test signal and subsequently simultaneously supplying the one of the plurality of vertical signal lines with the second test signal and supplying the other of the plurality of vertical signal lines with the first test signal.

6. The imaging apparatus according to claim 1, wherein the analog-digital converter is provided for each of the plurality of vertical signal lines, and
the gain ratio acquiring unit is further configured to simultaneously supply the one of the plurality of vertical signal lines with the first test signal and supply the other of the plurality of vertical signal lines with the second test signal and, for each gain of the level control circuit respectively set to 0 dB, the first gain, and the second gain, acquire the gain ratio by sequentially selecting the first test signal and the second test signal supplied to any of the one of the plurality of vertical signal lines and the other of the plurality of vertical signal lines.

7. The imaging apparatus according to claim 6, further comprising:
a first sample-and-hold unit configured to hold an analog signal output to the one of the plurality of vertical signal lines, and
a second sample-and-hold unit configured to hold an analog signal output to the other of the plurality of vertical signal lines, wherein
the level control circuit is further configured to sequentially perform the level control with respect to an output of any of the first sample-and-hold unit and the second sample-and-hold unit, and
the analog-digital converter is further configured to sequentially perform AD conversion with respect to a plurality of outputs of the level control circuit.

8. The imaging apparatus according to claim 7, wherein each of the first sample-and-hold unit and the second sample-and-hold unit includes two alternately operating sample-and-hold circuits.

9. The imaging apparatus according to claim 1, wherein the level control circuit is an analog gain circuit configured to output a voltage signal obtained by subjecting the analog signal to the level control, and
the analog-digital converter is a single slope analog-digital converter configured to convert the voltage signal into the digital signal.

10. The imaging apparatus according to claim 1, wherein the level control circuit is a voltage-to-current converter configured to output a current signal obtained by subjecting the analog signal the to level control, and
the analog-digital converter is a current-input type analog-digital converter configured to convert the current signal into the digital signal.

11. A gain ratio acquisition method in an imaging apparatus including a level control circuit which performs, using any of a first gain and a second gain that differ from each other, level control of an analog signal output to a vertical signal line of a plurality of vertical signal lines that corresponds to each column of a pixel array, an analog-digital converter which converts the level-controlled analog signal into a digital signal, and a test signal generating unit which generates a first test signal and a second test signal that differ from each other, the imaging apparatus simultaneously performing:
supplying one of the plurality of vertical signal lines with the first test signal to acquire a gain ratio between the first gain and the second gain of the level control circuit; and
supplying another of the plurality of vertical signal lines with the second test signal to acquire the gain ratio between the first gain and the second gain of the level control circuit.

* * * * *